Dec. 12, 1939.   J. H. TREECE ET AL   2,183,230
TUMBLER DECORATING APPARATUS
Filed Nov. 4, 1937   3 Sheets-Sheet 3
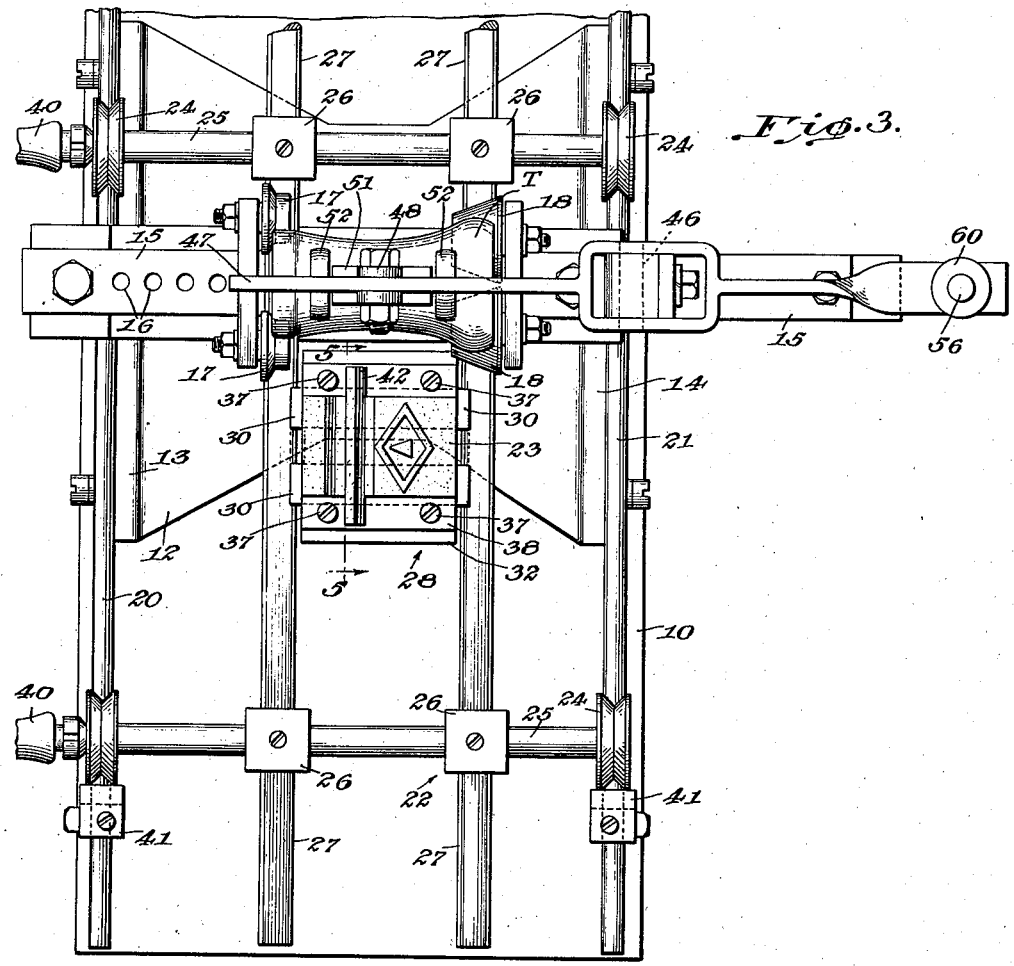
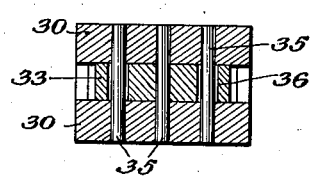
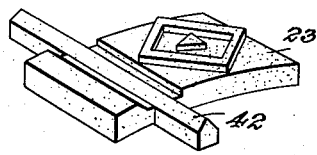
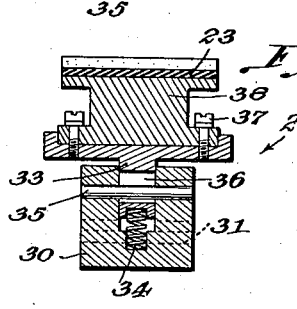
INVENTORS
J.H.Treece, H.L.Whitney
and H.W.Schneider,
BY
ATTORNEYS Patented Dec. 12, 1939

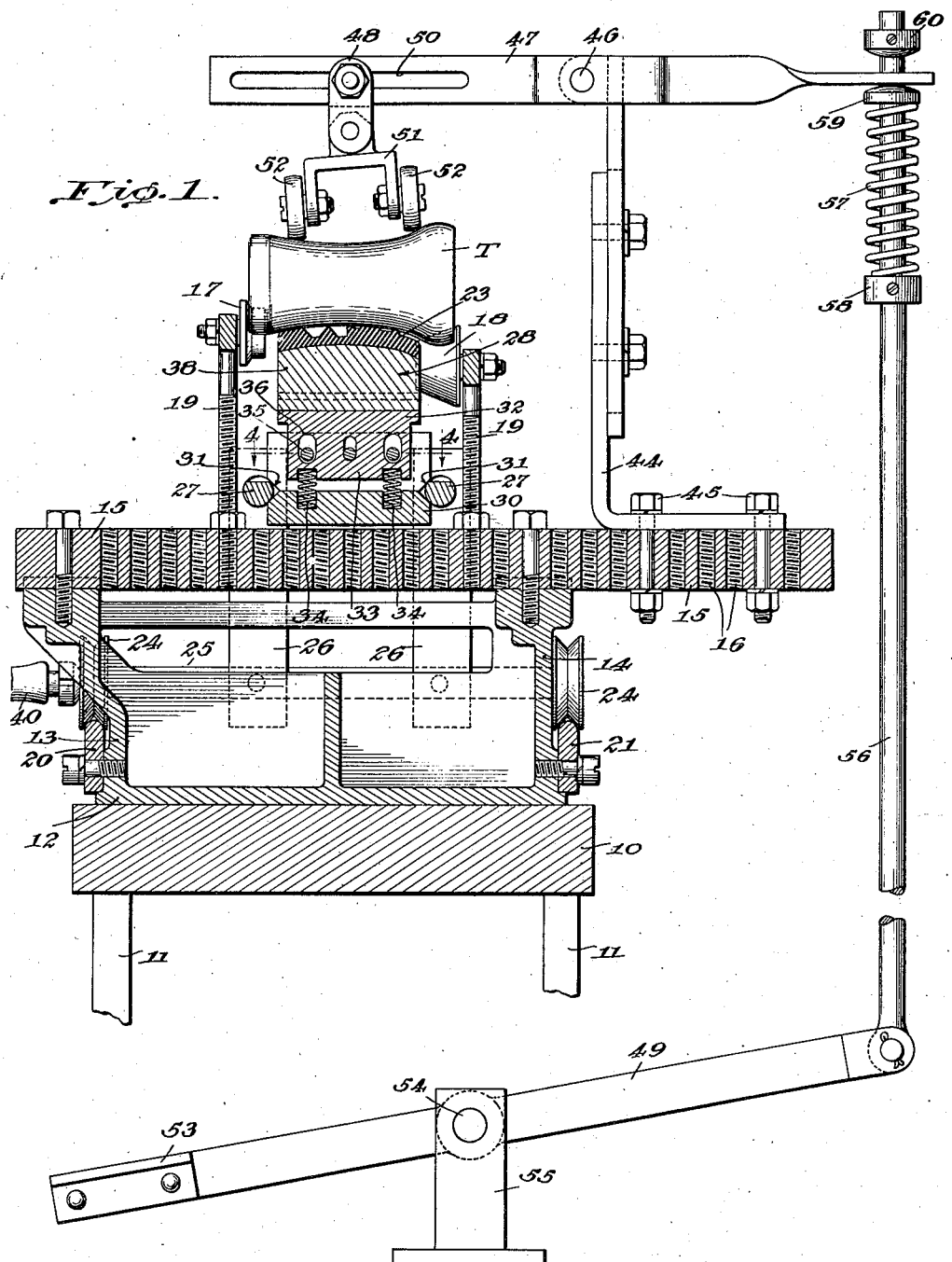

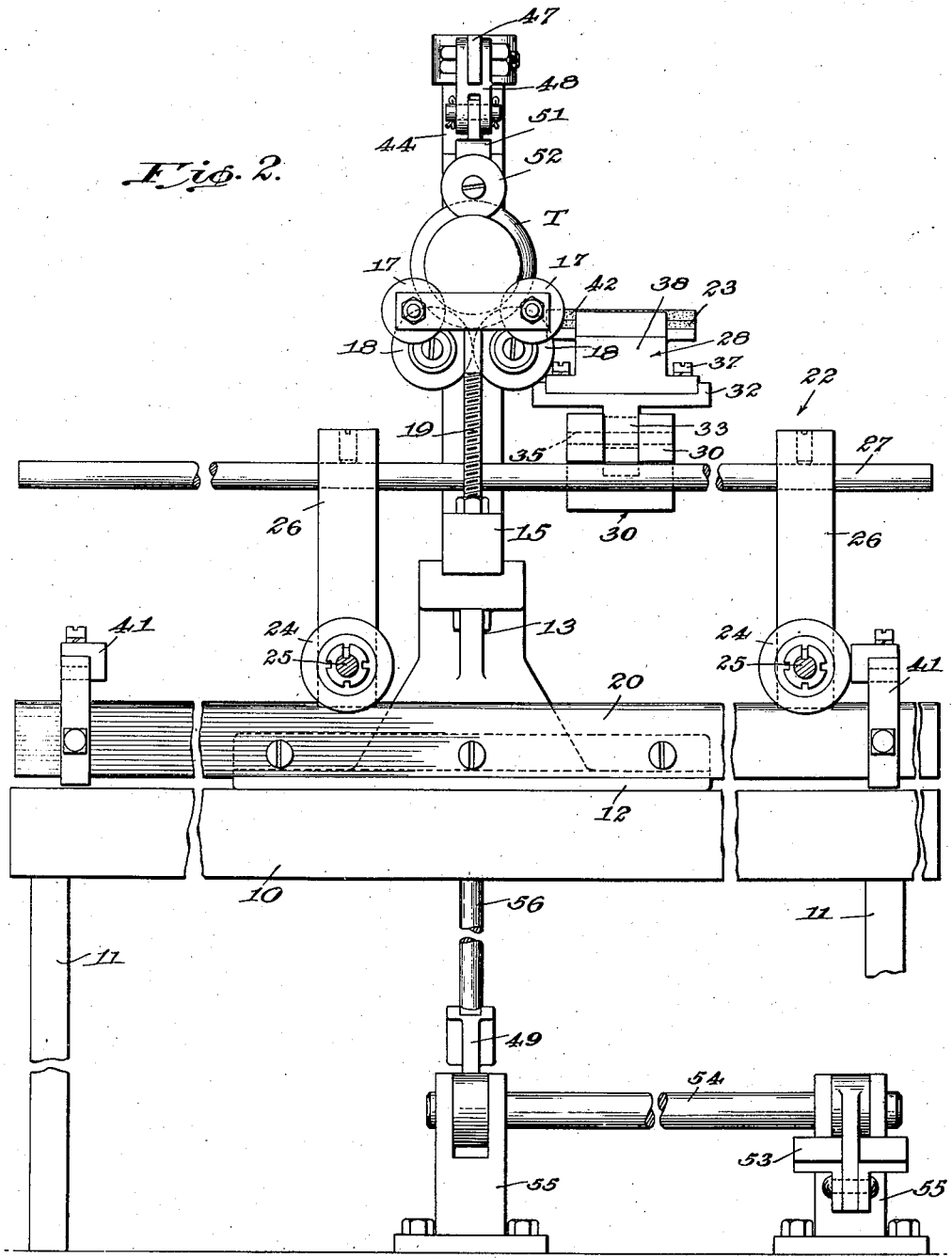

2,183,230

UNITED STATES PATENT OFFICE 2,183,230

TUMBLER DECORATING APPARATUS

Jesse H. Treece, Harry L. Whitney, and Henry W. Schneider, Toledo, Ohio, assignors to Libbey Glass Company, a corporation of Ohio Application November 4, 1937, Serial No. 172,654

3 Claims. (Cl. 101—38)

The present invention relates to decorating apparatus designed for use in applying a sizing material, which is in the nature of a glue, to the cylindrical or curved surfaces of articles of glassware such as tumblers, bottles, jars and the like, in order that these articles may subsequently be dusted with a suitable vitreous enamel powder which adheres to the sizing material, where applied, preparatory to heat treatment or baking of the articles in a baking leer.

The application of a sizing material to glass surfaces and the dusting and baking thereof is commonly referred to as a cresting process. The principal object of the invention is to provide an apparatus for facilitating cresting of glass articles which will economically, efficiently, and uniformly apply the sizing material to the cylindrical or curved surfaces of glass articles in a desired pattern by a printing process.

Toward this end, the invention contemplates the provision of an apparatus having a reciprocable printing pad to which the sizing material is repeatedly applied, after the printing operations, together with a supporting means for successively receiving the articles undergoing cresting, and by means of which each article is supported for rotation about its axis in the path of movement of the printing pad. Upon reciprocation of the printing pad, the latter is moved into tangential rolling line contact with the article, thus applying sizing material thereto. It is another object of the invention to provide an apparatus of the type set forth above in which the reciprocable printing pad is yieldingly mounted in its supporting carriage by a floating connection which permits of floating movement toward and away from the articles undergoing decoration to accommodate any existing unevenness or out-of-roundness of the articles.

Another object of the invention is to provide a novel means for supporting the articles and for bracing the same against shifting when contacted by the printing pad.

Still another object of the invention is to provide a printing pad having means associated therewith for tractionally engaging the articles and establishing rotation thereof, thus relieving the raised printing surfaces of the printing pad from this function and insuring a clearly defined printed design or crest.

Other objects of the invention, not at present enumerated, will become apparent hereinafter.

In the accompanying drawings:

Fig. 1 is a fragmentary vertical sectional view with certain parts shown in elevation taken longitudinally through a decorating machine constructed in accordance with the principles of the invention;

Fig. 2 is a fragmentary front elevational view of the machine;

Fig. 3 is a fragmentary top plan view of the machine;

Fig. 4 is a sectional view taken substantially along the line 4—4 of Fig. 1;

Fig. 5 is a sectional view taken substantially along the line 5—5 of Fig. 3; and Fig. 6 is a perspective view of a printing pad employed in connection with the present invention.

The apparatus involves in its general organization a table 10 having supporting legs 11 therefor. A casting 12 supported on and secured to the table 10 is provided with an upright portion 13 at its forward end with a similar upright portion 14 at its rear end. A supporting beam 15 (Figs. 1 and 3) is supported on, and extends across the upper ends of the upright portions 13 and 14 and projects rearwardly of the support 14. A plurality of threaded holes 16 are formed in the supporting beam 15 and are adapted to selectively accommodate therein the lower threaded ends of a pair of article supporting units 19. Opposed pairs of supporting rollers 17 and 18 serve to rotatably support therebetween in a cumbent position the articles to be decorated, which in the present instance for illustrative purposes are shown as being in the form of tumblers T.

A pair of front and rear, transversely extending, horizontal tracks 20 and 21 are bolted to the casting 12 on opposite sides thereof and are substantially coextensive with the table 10 which they overlie. Supported tractionally upon the tracks 20 and 21 and movable therealong in either direction transversely of the apparatus, is a printing carriage 22 having associated therewith a printing pad 23 which is adapted upon reciprocation of the carriage 22 to come into tangential rolling line contact with the articles T rotatably supported on the units 19. The carriage 22 includes supporting wheels 24 which ride upon the tracks 20 and 21 and which are mounted upon a pair of opposed side bars 25 of the carriage 22. A pair of corner posts 26 are mounted for longitudinal adjustment on each of the side bars 25 and the corner posts 26 of each pair serve to support therebetween a pair of parallel extending side bars 27 between which are adjustably clamped a printing pad assembly 28.

The printing pad assembly 28 comprises a U-shaped lower supporting block 30 or cradle (Figs.

1, 4 and 5) having V-shaped grooves 31 or notches in the sides thereof designed for reception of the side bars 27 in order that the printing pad assembly 28 may be clamped therebetween in any desired adjusted position transversely of the carriage 22. An upper supporting block 32 is supported for vertical floating movement on the lower block 30 and, toward this end, a tongue 33 or rib extends between the furcations of the block 30 and is supported upon a plurality of compression springs 34. Pins 35 (see also Fig. 4) extending across the furcations of the block 30, pass through slots 36 formed in the tongue 33 and serve to retain the two blocks in assembled position. It is to be noted that three such slots 36 have been provided in the tongue 33 and that the middle slot 36 and pin 35 are in close fitting engagement, thus preventing lateral shifting of the block 32. The middle slot 36 is shorter than the two other slots and it is this slot, therefore, that limits the upward movement of the block 32. The upper block 32 has mounted thereon by means of cap screws 37 a wooden mounting 38 the upper surface of which is arcuate and has secured thereto the rubber printing pad 23.

The carriage 22 is provided with a pair of handles 40 which extend forwardly from the ends of the side bars 25 and by means of which the carriage may be reciprocated on the tracks 20 and 21. A pair of limit stops 41 mounted at opposite sides of each track 20 and 21 serve to determine the amplitude or extent of reciprocation of the carriage 22. It will be seen from the foregoing description that upon reciprocation of the carriage 22 in either direction, the printing pad 23 will pass beneath the tumbler T, supported on the units 19, and in so passing will engage the cylindrical surface of the tumbler and apply the sizing material thereto. In order that there shall be no slippage between the surface of the tumbler T and the printing pad 23, which would ordinarily be the case if the actual printing surface of the pad were relied upon to impart turning movement to the tumbler, a traction strip 42 (Figs. 3 and 6) is formed integrally with the pad 23 and projects laterally from opposite sides thereof a short distance. As the pad 23 passes beneath the tumbler in either direction, the approaching end of the traction strip first engages the tumbler and imparts rotation thereto so that when the operative decorating portions of the pad come into engagement with the tumbler, the tumbler shall have commenced to rotate and there will be no tendency for the surface of the tumbler to slip on the pad.

In order to prevent the tumbler T from being elevated from the supporting rollers 17 and 18 upon contact with the printing pad 23, means is provided for receiving the upward thrust thus applied to the tumblers T. Accordingly, a two-part extensible standard 44 is secured to the rear projecting end of the supporting beam 15 by means of bolts 45 which are capable of being selectively received in the holes 16. The upper end of the standard 44 carries a rock-shaft 46 upon which there is tiltably mounted a substantially horizontal lever 47, the forward end of which overlies the tumbler supporting instrumentalities. A depending suspension bracket 48, which is adjustably secured in a slot 50 formed in the forward end of the lever 47, has pivoted to its lower end a second bracket 51 having rollers 52 thereon designed for engagement with the tumbler T. A foot lever 53 or treadle, secured at its rear end to a rock-shaft 54 supported between a pair of standards 55 extends forwardly to a region convenient to the foot of the operator of the apparatus. A second lever 49 secured to the shaft 54 is connected at its rear end by means of a link 56 to the rear end of the lever 47. The link 56 passes through the rear end of the lever 47 and a compression spring 57 surrounding the link 56 bears at its lower end against a collar 58 mounted in the link and at its upper end against a sliding washer 59 which bears yieldingly against the rear end of the lever 47 and serves to urge the same upwardly on the link 56 against a collar 60 secured to the link 56 near the upper end thereof. It will be seen, therefore, that when the operator actuates the foot treadle 53, the rear end of the lever 47 is yieldingly urged upwardly by means of the link 56 and spring 57, thus lowering the forward end of the lever 47 and bringing the rollers 52 firmly into yielding engagement with the tumbler T to maintain the same on the supporting rollers 17 and 18 against any tendency of the printing pad 23 to dislodge the same.

In the operation of the apparatus, the tumblers T are successively placed on the supporting rollers 17 and 18 and immediately after each placement the operator depresses the foot treadle 53, thus bringing the rollers 52 into yielding engagement with the tumbler to prevent dislodgment of the same from its cumbent rotatable position. By means of the handles 40 the carriage 22 is moved in one direction or the other and, as the printing pad 23 approaches the tumbler, the traction strip 42 engages the tumbler tangentially and imparts rotation thereto. The tumbler thus commences to rotate before it is contacted by the raised printing portions of the pad and hence these printing portions are spared the function of imparting turning movement to the tumbler, consequently eliminating the possibilty of slippage between the pad and tumbler. The pad 23, having previously been coated with a suitable sizing material, transfers a portion of the sizing material to the surface of the tumbler in passing and, when the carriage 22 has reached the end of its stroke, the operator releases the foot treadle 53 thus causing the rollers 52 to be raised from the tumbler T to permit substitution in the apparatus of an untreated tumbler. The treated tumbler to which sizing material has been applied in the form of a pattern or design is dusted with a suitable vitreous enamel powder which adheres only to the sized portions of the tumbler and the treated article is then baked in a suitable baking leer.

During the next succeeding sizing operation on the substituted tumbler, the carriage 22 is moved in the opposite direction and otherwise the procedure is substantially the same as that just described.

The invention is susceptible to modifications within the spirit of the appended claims. For example, while the apparatus herein described has been set forth in connection with the application of a sizing material to the surfaces of tumblers which are subsequently to be dusted with a suitable enamel powder, the printing pad 23 may, between successive operations, be primed with a suitable colored ink, paint, enamel or the like, and the complete decorating operation may be performed by a single stroke of the carriage 22.

We claim:
1. In an apparatus for printing on the surfaces of tumblers, a tumbler support adapted to loosely receive thereon a tumbler to be decorated including means for maintaining the tumbler freely rotatable about a horizontal axis, a reciprocable carriage, a printing pad yieldingly mounted on the carriage and adapted upon reciprocation of the latter to be moved into yielding tangential line contact with the tumbler, a traction strip integrally formed on the pad and extending across the pad and outwardly from opposite sides thereof in the directions of movement of the carriage, said strip being adapted to engage the tumbler upon reciprocation of the carriage to impart rotation thereto, means for reciprocating the carriage, and means movable into and out of tangential rolling line engagement with the tumbler on the support for preventing dislodgment of the tumbler from the support when contacted by said printing pad and traction strip.

2. In an apparatus for printing on the surfaces of tumblers, a tumbler support adapted to loosely receive thereon a tumbler to be decorated including means for maintaining the tumbler freely rotatable about a horizontal axis, a reciprocable carriage movable beneath said support in a horizontl path, a cradle on said carriage, a mounting yieldingly supported in the cradle for vertical movement with respect thereto, means preventing lateral shifting of the mounting with respect to the cradle, a printing pad on said mounting, said pad being adapted upon reciprocation of the carriage to engage the tumbler tangentially, a traction strip integrally formed on the pad and extending across the pad and outwardly from opposite sides thereof in the direction of movement of the carriage, said strip being adapted to engage the tumbler to impart rotation thereto, means for reciprocating said carriage, and means movable into and out of tangential rolling line engagement with the tumbler on the support for preventing dislodgment of the tumbler from the support when contacted by said printing pad.

3. In an apparatus for printing on the surfaces of tumblers, a tumbler support adapted to loosely receive thereon a tumbler to be decorated including means for maintaining the tumbler freely rotatable about a horizontal axis, a reciprocable carriage movable beneath said support in a horizontal path, a cradle on said carriage, a mounting yieldingly supported in the cradle for vertical movement with respect thereto, means preventing lateral shifting of the mounting with respect to the cradle, a printing pad on said mounting, said pad being adapted upon reciprocation of the carriage to engage the tumbler tangentially, means for reciprocating said carriage, and means movable into and out of tangential rolling line engagement with the tumbler on the support for preventing dislodgment of the tumbler from the support when contacted by the printing pad.

JESSE H. TREECE.
HARRY L. WHITNEY.
HENRY W. SCHNEIDER.